United States Patent Office 2,848,891
Patented Aug. 26, 1958

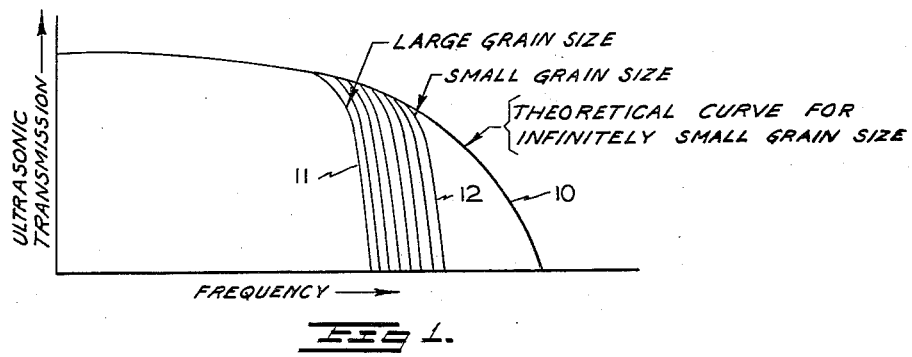
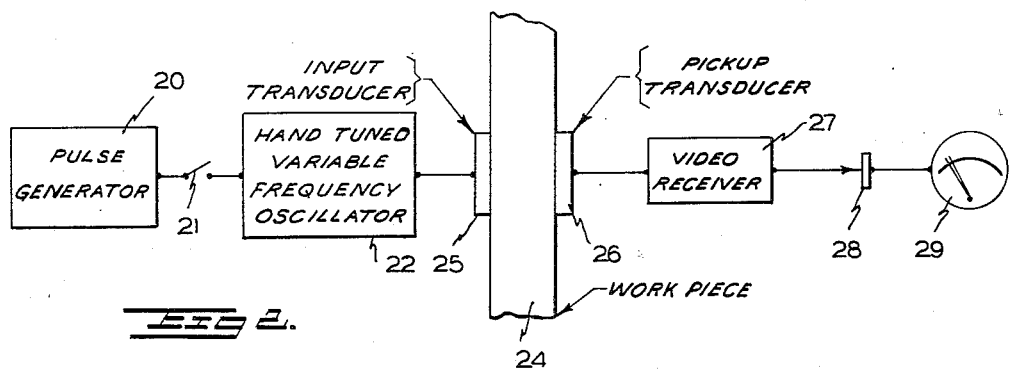
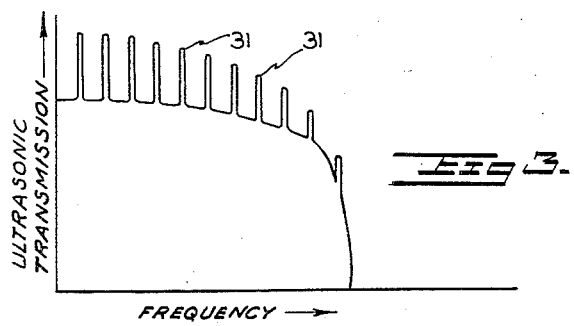

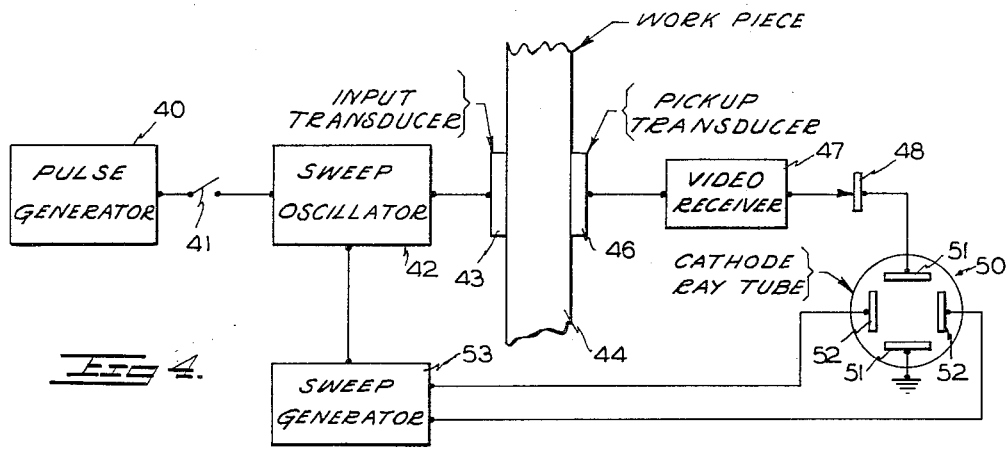
Fig. 4.
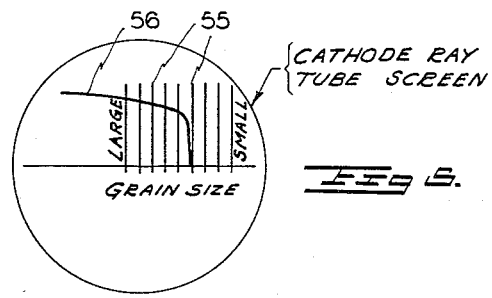
Fig. 5.
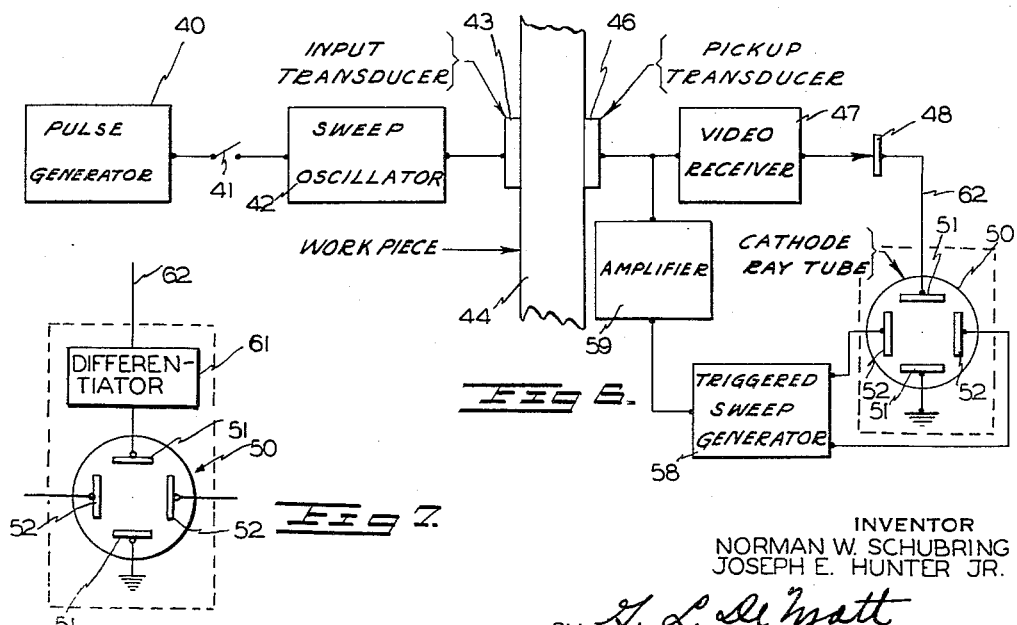
Fig. 6.
Fig. 7.
INVENTOR
NORMAN W. SCHUBRING
JOSEPH E. HUNTER JR.

2,848,891

APPARATUS FOR ULTRASONIC TESTING

Joseph E. Hunter, Jr., Royal Oak, and Norman W. Schubring, Hazel Park, Mich., assignors to General Motors Corporation, Detroit, Mich., a corporation of Delaware Application August 19, 1954, Serial No. 451,023

4 Claims. (Cl. 73—67.5)

The present invention relates generally to means for testing materials and more particularly relates to apparatus employing compressional, ultrasonic waves for determining the size of crystals or grains in a material under test.

While the present invention is not limited to the testing of any particular material, it finds particular use in the determination of grain size in metals.

It is well known that grain size affects the physical properties of steels. The control of grain size of steel is an important factor in heat treatment, forging, case-hardening, and mechanical working of steel. Coarse-grain-size steel, for example, has a tendency to produce sounder metal and more uniformly flowing metal than fine-grain size steel and, therefore, is particularly suitable in the formation of forgings of greater strength and density. Steel for case-hardening, on the other hand, should have an intermediate grain size. With coarse-grained steel, quicker, deeper, and more penetration of carbon is obtained resulting in a harder and more even case, but the coarseness is limited by the greater tendency to crack, warp, and check on grinding. Fine-grain-size steel causes more shallow hardening but freedom from the mentioned defects. Because of the variation of mechanical properties of steel with grain size, steel of a given grain size is specified for many applications in order to give greater latitude for safe heat treatment and mechanical operations.

At present, to determine accurately the size of grains in a stock sample, difficult etching techniques on polished sections are required to reveal clearly the grain size in different stock. Once the grain size is revealed, it is measured under a microscope and expressed in terms of area of grain, or more simply, by comparison with standard micrographs. The American Society of Testing Materials (ASTM) has put out a comparison chart, and grain size is universally expressed by ASTM numbers.

The above method of determining grain size is disadvantageous not only in that it is difficult to obtain suitable samples for microscopic inspection, but optic determination of grain size is a relatively slow, inaccurate procedure.

It is, therefore, a principal object of the present invention to avoid the above-mentioned and other difficulties of prior art methods and apparatus by the provision of an improved, easily operated apparatus for detecting, by means of ultrasonic vibrational waves, the size of grains in a material under test.

It has been found that in transmitting ultrasonic vibrational waves through a given material, the ultrasonic energy transferred through the material at a given frequency is a function of the grain size of the material. Moreover, it has been found that the attenuation of the ultrasonic energy increases sharply when the wave length at which the energy is transmitted is approximately three (3) to four (4) times the grain size. In other words, as the grain in a given sample approaches the size approximating one-quarter to one-third of the wave length of the ultrasonic energy transmitted therethrough, the attenuation of energy increases sharply.

One explanation of this phenomenon is that as a vibrational wave passes near the edge of an object, in this instance a grain of material, the wave has a tendency to become bent toward and around the grain. This bending is known as diffraction. If the length of the ultrasonic wave transmitted is sufficiently insignificant, no appreciable diffraction occurs and the ultrasonic energy is transmitted through the material with little attenuation. However, if the frequency at which the energy is transmitted is increased, thereby decreasing the length of the ultrasonic wave, the grain size becomes appreciable in comparison to the wave length. As a result, there is more diffraction of the wave and an increase in attenuation of energy. When the length of the wave reaches a value such that, by comparison, the grain size approximates one-quarter to one-third wavelength, the wave is diffracted at random, and the energy is diffused by continuous reflection. Thus a sudden attenuation occurs at that point at which the grain size in the material under test is about one-quarter to one-third of the length of the ultrasonic wave transmitted through the material.

Additional objects of the present invention, therefore, are the provision of an ultrasonic apparatus for rapidly determining the size of grains in a material under test independent of workpiece dimensions within reasonable limits, and the provision of apparatus employing ultrasonic frequencies and adapted to be operated by one of ordinary skill to quickly and accurately ascertain grain size within a given material.

The operation of the device for determining grain size of material in accordance with the present invention, comprises generally the steps of applying ultrasonic vibrational waves to the material under test, receiving the energy transmitted through the material, and varying the frequency of the applied wave until there is a sudden decrease in the amount of energy received.

The apparatus, in accordance with the present invention for carrying out the above described method, includes a variable high frequency oscillator for producing electrical signals, an input transducer for converting the electrical signals to mechanical ultrasonic vibrations and applying the vibrations to the material under test, an output transducer for picking up at least a portion of the vibrations transmitted through the material and converting the vibrations into electrical signals, and means for recording the latter electrical signals.

The novel features that are considered characteristic of this invention are set forth with particularity in the appended claims. The invention itself, however, both as to its organization and method of operation, as well as additional objects and advantages thereof, will be best understood from the following description when read in connection with the accompanying drawings in which:

Figure 1 is a graph showing curves of ultrasonic transmission plotted with respect to frequency of the transmitted wave for materials having different grain sizes;

Figure 2 is a block diagram of apparatus provided in accordance with the present invention for obtaining a point-by-point plot of the curves of Figure 1;

Figure 3 is a graph showing ultrasonic transmission plotted with respect to frequency of the transmitted wave, and including pulses representing standing wave resonance within the material under test:

Figure 4 is a block diagram of apparatus provided in accordance with the present invention for obtaining an automatic visual display of the graph of Figure 3 or a graph having the standing wave pulses removed;

Figure 5 is a plan view of a calibrated screen for use with the visual indicator of Figure 4;

Figure 6 is a block diagram of apparatus for obtaining an automatic visual indication of the grain size of a material under test in accordance with a further embodiment of the present invention; and Figure 7 is a block diagram of an additional embodiment, in accordance with the present invention, of that portion of Figure 6 that is enclosed in dotted lines.

As stated above, the attenuation versus frequency characteristic of ultrasonic energy in a given material is a function of the grain size within the material. Therefore, for samples of a given material, each sample of which has a different grain size, a comparison of their attenuation versus frequency characteristics will permit establishing a criterion for indicating average grain size. Since ultrasonic transmission equals power input minus attenuation, it is more convenient from an instrumentation standpoint to deal with the characteristic of ultrasonic transmission versus frequency.

Referring now to Figure 1, the curve 10 illustrates the theoretical variation of ultrasonic transmission through a material having an infinitely small grain size as the frequency of the ultrasonic vibrational waves applied to the material is gradually increased. It is a fundamental principle that the frequency ($f$) of ultrasonic waves is directly proportional to the velocity ($v$) of the waves through the medium and inversely proportional to the wave length ($\lambda$) of the ultrasonic wave; the formula being $$f = \frac{v}{\lambda}$$

It is thus seen that for a given material, and accordingly a given constant velocity, an increase in frequency of the applied waves results in a reduced or shorter wave length. As the length of the ultrasonic wave applied to a material approaches the size of the grains within the material, the waves are diffracted at random and the energy dispersed. In the theoretical case of a material having infinitely small grain size, the dispersion of ultrasonic energy is gradual, and the transmission may be depicted as an exponential curve.

In the case of a material having a finite grain size there is a change in the exponent of the theoretical curve and a sudden change in slope of the curve. This change in the exponent and change in slope occurs at that frequency at which the relative size of the grains in the material is approximately one-quarter to one-third the wave length of the transmitted wave. At this frequency the vibrational waves are more readily diffracted, resulting in an increase in attenuation and a sudden decrease in ultrasonic transmission. Curve 11 illustrates ultrasonic transmission through a material having a large grain size, and curve 12 shows the ultrasonic transmission through a material having a relatively small grain size. The curves between curve 11 and 12 represent transmission curves for materials of gradually decreasing grain size. It is obvious that the curves could be numbered to denote average grain size in accordance with ASTM Standards.

Referring now to Figure 2, the pulse generator 20, which may be a conventional multivibrator of the free-running type, is adapted to be selectively coupled by means of the switch 21 to the control element of a tunable variable high frequency oscillator 22. The oscillator 22 is preferably of the electronic type and may include one or more electronic devices. In the event a conventional vacuum triode tube is employed as the oscillator, the grid of the triode would constitute the control element to which the output of the pulse generator 20 might be coupled. By way of example, when designed for use in determining the grain size of steels, the oscillator should be capable of generating electrical oscillations having a fundamental or harmonic frequency of from approximately 500 kilocycles (kc.) for testing large grain size material, to about 25,000 kc./s. for testing materials of fine grain structure.

In order to convert the electrical oscillations generated by the oscillator into ultrasonic vibrational waves, and direct the waves against the sample material or workpiece 24, an electro-mechanical input transducer 25 is electrically coupled to the oscillator 22 and mechanically connected, as by clamping, or other suitable means, to one surface of the workpiece 24. The vibratable surface of the input transducer is preferably arranged in closely abutting relation to the surface of the workpiece. An electro-mechanical pickup transducer 26 is mechanically connected to an opposite surface of the workpiece and is actuated by the vibrational waves transmitted through the workpiece to produce electrical impulses having an amplitude corresponding to the value of ultrasonic transmission through the workpiece. The transducer 26 is electrically coupled to a receiver 27 wherein the electrical impulses from the transducer 26 may be amplified. A meter 29, which is preferably of the direct current (D. C.) type, is coupled to the output of the receiver 27 by a rectifier 28 which may be of the crystal or diode tube type. The meter 29 indicates the amplitude of the impulses produced by the transducer 26, and accordingly the magnitude of the transmission of ultrasonic waves through the workpiece 24.

The apparatus of Figure 2 may be operated with the switch 21 in its open position, as illustrated, or with the switch closed. Assuming the switch 21 is open, the high frequency oscillator 22 will generate a continuous train of electrical oscillations which are applied to the input transducer 25 causing the transducer to vibrate and send out ultrasonic vibrational waves. The vibrational waves are directed against one surface of the workpiece 24 and upon passing through the workpiece are received from another surface of the workpiece by the pickup transducer 26. The mechanical vibrations of the transducer 26 are converted into electrical impulses in a well-known manner. The receiver 27, electrically coupled to the transducer 26, amplifies the electrical impulses produced by the transducer and converts the impulses into audible or visual signals. The amplified electrical impulses are detected by the rectifier 28 and applied to the D. C. meter 29 whereby the magnitude of the electrical impulses is determined. For a given initial frequency of oscillations generated by the oscillator 22, a particular magnitude of the electrical impulses will be indicated on the meter 29 corresponding to the value of ultrasonic transmission through the workpiece 24. The frequency of the electrical oscillations generated by the oscillator 22 may now be gradually varied by manually adjusting, for example, the tuning capacitor or inductor of the oscillator. As the frequency of the oscillations is gradually increased, the value of ultrasonic transmission through the workpiece, as indicated by the meter 29, will gradually diminish until that point at which the frequency and accordingly the wave length of the waves in the workpiece is of such order that, in comparison, the grain size of the workpiece corresponds to approximately one-quarter to one-third of the length of the vibrational waves. At this point, a sudden decrease in transmission through the workpiece occurs, as indicated by a sudden drop in the value of the electrical impulse magnitude indicated by the meter 29. By adjusting the output frequency of the oscillator 22 and recording the corresponding magnitude of the electrical impulses produced by the pickup transducer 26, a curve of ultrasonic transmission versus frequency may be plotted. By noting the frequency and hence the wave length of the transmitted wave at the point where the plotted curve suddenly breaks, the grain size of the workpiece may readily be ascertained by reason of the fact that the grain size is known to be approximately one-quarter to one-third of the wave length at that point.

One difficulty encountered in obtaining a point by point plot of an ultrasonic transmission versus frequency curve in the manner described above results from interference with the transmitted wave by reflected waves traveling within the workpiece. Due to the fact that in passing through the workpiece a large portion of the sonic energy is reflected from the interface between the workpiece and the pickup transducer, the reflected wave will at certain frequencies return to the input transducer in a phase such as to reinforce the input wave. Consequently, standing waves will be set up in the workpiece and standing wave resonant responses will be noted at all multiples of the fundamental natural frequency of the workpiece. The standing wave resonant responses or impulses are noted at 31 on the curve in Figure 3. Because of the pulses 31 it is often difficult to ascertain readily the point at which ultrasonic transmission suddenly decreases and, therefore, difficult to accurately determine grain size of the work unless a great number of points on the curve are plotted.

It is to overcome this difficulty that the pulse generator 20 of Figure 2 is provided. If the switch 21 is now closed to electrically couple the pulse generator 20 to the control element of the oscillator 22, the output of the oscillator, and the ultrasonic waves directed against the workpiece will occur in pulses. If, as stated above, the oscillator 22 comprises a conventional triode vacuum tube, the pulse generator 20, by being coupled to the control element or grid of the tube applies a control voltage to the grid in pulses. By so controlling the bias on the control element the output of the oscillator occurs in pulses. By making the pulses sufficiently narrow and keeping the pulse repetition rate low, the reflected waves within the workpiece can be prevented from arriving at the input transducer until after the input pulse has died out. In this manner, the objectionable standing wave resonance responses are overcome and the ultrasonic transmission versus frequency curve can be determined with far fewer readings.

An automatic, instantaneous display, instrument for inspecting the interior of an article in accordance with the present invention will now be described in connection with Figure 4. The pulse generator 40 is adapted to be selectively coupled by the switch 41 into the circuit of the variable frequency or sweep oscillator 42. An electromechanical input transducer 43 is electrically coupled to the oscillator 42 and mechanically coupled to one surface of the workpiece 44. A pickup transducer 46 is mechanically coupled to the workpiece 44 and electrically connected in circuit with a receiver 47 wherein the electrical impulses produced by the pickup transducer are amplified. In order to obtain a visual indication of the ultrasonic transmission versus frequency characteristic of the workpiece 44, a cathode ray tube, which may be part of a conventional oscilloscope, is provided and indicated generally by the reference numeral 50. The cathode ray tube includes a pair of vertical beam deflecting plates 51 coupled to the output circuit of the receiver 47 through a rectifier 48. The horizontal beam deflecting plates 52 of the tube 50 are connected in circuit with a sweep generator 53, that is in turn coupled to and synchronized with the sweep oscillator 42.

The operation of the apparatus of Figure 4 is as follows: The sweep oscillator 42 repetitively produces electrical oscillations having a frequency that varies continuously across a band of frequencies from a low frequency of about 5,000 kc./s., for example, to a high frequency of about 10,000 kc./s., for example. The electrical oscillations are converted to mechanical vibrations by the input transducer 43, and these vibrations are fed to the workpiece 44 in which the grain size is to be determined. Upon being transmitted through the workpiece, the vibrational waves are changed into electrical signals by the pickup transducer 46. The electrical signals are amplified by the video receiver 47, detected by the rectifier 48, and applied to the vertical deflection plates 51 of the cathode ray tube 50. The output voltage of the sweep generator 53, which may have a frequency of about 60 cycles per second, besides supplying the sweep control signal to the oscillator 42, is simultaneously fed to the horizontal deflection plates 52 of the tube 50 so as to sweep the beam of the cathode ray tube from left to right across the face of the tube in synchronism with the changing frequency of the sweep oscillator. The resulting curve traced on the face of the tube will be representative of the ultrasonic transmission versus frequency characteristic of the workpiece 44. As in the embodiment of Figure 2 the sweep oscillator 42 may be pulsed by closing the switch 41 to thereby eliminate standing wave resonant responses associated with the workpiece in the event that these responses interfere with the discernability of the inflection point on the curves.

The screen of the cathode ray tube 50 may be calibrated as shown in Figure 5 with the vertical lines 55 representing the average grain size of the workpiece under test. In the illustration, the curve 56 would indicate that the workpiece was composed of medium size grains. It is obvious that the vertical lines 55 could be numbered to correspond to standard grain size members as established by the ASTM, for example.

To make the display shown in Figure 5 a true representation of ultrasonic transmission versus frequency, the system, excluding the workpiece, should preferably have linear transmission characteristic. The transducers 43 and 46, for example, and the rectifier 48, are inherently nonlinear devices, and thus by introducing non-linear or amplitude distortion into the system tend to contribute to undesirable slopes in the display which may render the inflection point of the curve less discernible. Reference is made to the book entitled "Radio Engineering" by Terman-McGraw-Hill Book Company, 1932, pages 121, 122 for a definition of amplitude distortion. As pointed out by Terman, amplitude distortion may be minimized by employing a high impedance load in the amplifier circuits and by operating the amplifier over that portion of the plate current-plate voltage characteristic curve which has the least curvature. It is apparent, then that by designing the oscillator and amplifier characteristics, the undesirable slopes introduced by the non-linear devices may be compensated for. Additional compensation may be provided by employing selective feedback in the amplifier circuits to minimize the amplitude distortion introducive by the non-linear devices.

When employing the system illustrated in Figure 4 to test a sizable workpiece having a long sonic path, the delay of the transfer of ultrasonic energy through the workpiece may become sufficiently significant to affect the validity of the calibration of the system since the cathode ray tube trace is synchronized with the frequency of the waves directed into the workpiece, rather than with that of the waves received from the workpiece. The difficulty may be overcome when testing a sizable workpiece by employing the further embodiment in accordance with the present invention illustrated in Figure 6.

The latter embodiment is the same as that described above in connection with Figure 4 with the exception that the horizontal deflection of the cathode ray tube beam is now synchronized with the frequency of the vibrational waves as they are received from the workpiece 44. As shown in Figure 6, the horizontal deflection plates 52 are connected in circuit with a controlled or triggered sweep generator 58 which has a sweep frequency identical to that of the sweep oscillator 42. The sweep generator is coupled to and initiated by a highly selective amplifier 59 which is electrically connected to the pickup transducer 46. In the operation of this embodiment the electric signal produced at the pickup transducer is applied to the vertical deflection plates by means of the receiver 47 and the rectifier 48. Simultaneously, the electric signal at the pickup transducer is applied to the highly selective amplifier 59, which is tuned to the lowest frequency of the swept band, for example, 5,000 kc. When this lowest frequency arrives at the pickup transducer, the amplifier 59 responds to provide an output pulse that triggers the sweep generator 58 to produce a horizontal beam deflection from left to right in synchronism with the sequence of the sweep oscillator 42. By making the amplifier 59 highly selective, multiple triggering of the sweep generator 58 is prevented.

As stated and shown above, in theory, the characteristic of ultrasonic transmission versus frequency is an exponential curve out to a frequency at which the average grain size approaches a quarter wave length of the vibrational wave in the material under test. Somewhere in the region of this frequency there is a change in the exponent of the curve. Accordingly, if the detected signal is applied to multiple differentiating circuits prior to its application to the vertical deflection plates 51, the signal inflection due to this exponent change is accentuated so as to become more nearly a step function. This arrangement is useful to more precisely correlate a certain fraction of the ultrasonic wave length to a calibration system indicating grain size directly in units of length. Such an arrangement may be obtained by substituting the circuit of Figure 7 for that portion of Figure 6 that is enclosed in dotted lines. In Figure 7 the multiple differentiating circuit generally indicated by the reference numeral 61 is connected in circuit with the vertical deflection plates 51 of the cathode ray tube 50 and the conductor 62 leading to the rectifier 48.

From the above it will be seen that apparatus capable of quickly and accurately determining the grain size in a given material by ultrasonic testing means is provided. Moreover, no special skill is required to practice the invention. The particular type of variable high frequency oscillator, pulse generator, and sweep generator is subject to variation and no special type of equipment other than standard equipment is required to accomplish the purposes of the invention.

The foregoing description of the invention is explanatory thereof, and various changes in the arrangement of associated parts may be made within the scope of the appended claims, without departing from the spirit of the invention. By way of example, when pulsed oscillations are employed in either the manual tuned embodiment of Figure 2 or the automatic embodiment of Figures 4 and 6, the input and pickup transducers may be one and the same provided that suitable switching circuits are incorporated. When a single transducer is thus employed, the ultrasonic energy that is directed against one side of the workpiece is transmitted through the workpiece, reflected from an opposite side and returned to the transducer. Furthermore, acoustical coupling between a remotely located transducer and the workpiece may be accomplished by immersion in a relatively low attenuation liquid.

What is claimed is:

1. In a device for the determination of the size of grains in a given article the combination of means for recurrently generating variable high frequency electrical oscillations at a predetermined sweep frequency, a first electro-mechanical transducer electrically coupled to said first means and mechanically coupled to a surface of said article, a second electro-mechanical transducer mechanically coupled to an opposite surface of said article and actuated by mechanical vibrations transmitted therethrough, a sweep generator having a sweep frequency identical to that of said means for generating oscillations, an oscilloscope having pairs of beam deflecting plates, one of said pairs of deflecting plates being electrically coupled to said second transducer and the other of said pairs of deflecting plates being connected to said sweep generator, a calibrated screen on said oscilloscope correlating the oscilloscope trace with the size of grain in said article, and means connected in circuit with said second transducer and said sweep generator and responsive to the lowest frequency oscillations produced by said means for generating oscillations to initiate the operation of said sweep generator.

2. In a device for the determination of the size of grains in a given article the combination as defined by claim 1, wherein, said means connected in circuit with said second transducer and said sweep generator comprises an amplifier means tuned to the lowest frequency produced by said means for generating oscillations.

3. In a device for the determination of the size of grains in a given article the combination of a sweep oscillator for generating variable high frequency electrical oscillations, a first electro-mechanical transducer energized by said electrical oscillations and mechanically coupled to a surface of said article, a second electro-mechanical transducer mechanically coupled to an opposite surface of said article and actuated by ultrasonic vibrations transmitted through said article, a highly selective amplifier tuned to the lowest frequency generated by said sweep oscillator electrically coupled to said second transducer, a sweep generator coupled to said amplifier and initiated thereby, said sweep generator having a sweep frequency identical to that of said sweep oscillator, and an oscilloscope having pairs of beam deflecting means, one of said pairs of deflecting means being connected to said sweep generator and the other of said pairs of deflecting means being coupled to said second transducer.

4. In a device for the determination of the size of grains in a given article the combination as defined by claim 3 wherein, a differentiator is connected in circuit between said other of said pairs of deflecting means and said second transducer.

References Cited in the file of this patent

UNITED STATES PATENTS

| | | |
|---|---|---|
| 2,431,234 | Rassweiler et al. | Nov. 18, 1947 |
| 2,534,006 | De Lano et al. | Dec. 12, 1950 |
| 2,605,633 | Gow | Aug. 5, 1952 |
| 2,682,766 | VanValkenburg | July 6, 1954 |
| 2,728,405 | Brant | Dec. 27, 1955 |

OTHER REFERENCES

Pages 134, 135 and 245–248 of Book "Ultrasonics," by Benson Carlin, pub. by McGraw-Hill, April 8, 1949.

Article by W. Roth, pp. 901–910 in October 1948 issue of Journal of Applied Physics.

Article by Mason et al., pp. 940–946 in October 1948 issue of Journal of Applied Physics.